US 7,920,752 B2

United States Patent
Kuno (10) Patent No.: US 7,920,752 B2
(45) Date of Patent: Apr. 5, 2011

(54) IMAGE PROCESSING DEVICE THAT QUICKLY PERFORMS RETINEX PROCESS

(75) Inventor: Masashi Kuno, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 904 days.

(21) Appl. No.: 11/837,817

(22) Filed: Aug. 13, 2007

(65) Prior Publication Data

US 2008/0044099 A1 Feb. 21, 2008

(30) Foreign Application Priority Data

| Aug. 17, 2006 | (JP) | 2006-222307 |
| Aug. 29, 2006 | (JP) | 2006-231553 |
| Aug. 29, 2006 | (JP) | 2006-231621 |

(51) Int. Cl.
*G06K 9/40* (2006.01)
*G06K 9/00* (2006.01)

(52) U.S. Cl. ...................... 382/254; 382/167
(58) Field of Classification Search .................. 382/254, 382/260, 264, 275, 298, 300, 312, 318, 324, 382/162, 167, 168, 271, 272, 274; 348/254, 348/223.1, 231.6; 358/518, 519, 525
See application file for complete search history.

(56) References Cited

U.S. PATENT DOCUMENTS

| 6,885,482 B1 | 4/2005 | Kubo et al. |
| 6,947,176 B1 | 9/2005 | Kubo et al. |
| 7,298,917 B2* | 11/2007 | Sakatani et al. ............ 382/254 |
| 7,760,943 B2* | 7/2010 | Shaked ........................ 382/174 |
| 2003/0012448 A1 | 1/2003 | Kimmel et al. |
| 2004/0091164 A1 | 5/2004 | Sakatani et al. |
| 2005/0013506 A1 | 1/2005 | Yano |

FOREIGN PATENT DOCUMENTS

JP 2001-69525 3/2001

(Continued)

OTHER PUBLICATIONS

Abstract only of Japanese Patent Application Publication No. 2004165840 dated Jun. 10, 2004.
Japanese Official Action dated Sep. 14, 2010 from Japanese Application 2006-231553 with English language translation.

(Continued)

*Primary Examiner* — Yon Couso
(74) *Attorney, Agent, or Firm* — Scully, Scott, Murphy & Presser, PC (57) ABSTRACT

An image processing device includes a reduced-image creating portion, a reduced-retinex-image forming portion, a normalizing-parameter setting portion, and an original-image correcting portion. The reduced-retinex-image forming portion calculates reflectance of each pixel in a reduced image based both on a pixel value of a subject pixel in a reduced image and on a peripheral average luminance of the subject pixel, thereby forming a reduced retinex image that is configured of reflectance of each pixel in the reduced image. The normalizing-parameter setting portion obtains frequencies of the reflectance in the reduced retinex image and sets an upper limit and a lower limit for normalization. The original-image correcting portion includes a retinex-image forming portion, a first normalizing portion, and a first correcting portion. The retinex-image forming portion calculates reflectance of each pixel in the original image based both on a pixel value of a subject pixel in the original image and on a peripheral average luminance of the subject pixel. The first normalizing portion normalizes the reflectance of the original image based on the upper limit and the lower limit, thereby obtaining a normalized reflectance for each pixel in the original image. The first correcting portion corrects the original image based both on the normalized reflectance and on the pixel value for each pixel in the original image, thereby obtaining a corrected original image.

23 Claims, 8 Drawing Sheets

FOREIGN PATENT DOCUMENTS

| | | |
|---|---|---|
| JP | 2001-78025 | 3/2001 |
| JP | 2003-333331 | 11/2003 |
| JP | 2005-004510 | 1/2005 |
| JP | 2005-039458 | 2/2005 |
| JP | 2005-515515 | 5/2005 |
| JP | 3731577 | 10/2005 |
| WO | WO 2005/036870 A1 | 4/2005 |

OTHER PUBLICATIONS

Japanese Official Action dated Sep. 14, 2010 from Japanese Application 2006-222307 with English language translation.

Japanese Official Action dated Nov. 24, 2010 from Japanese Application 2006-231621 with English language translation.

* cited by examiner

FIG.8

IMAGE PROCESSING DEVICE THAT QUICKLY PERFORMS RETINEX PROCESS

CROSS REFERENCE TO RELATED APPLICATIONS

This application claims priority from Japanese Patent Applications No. 2006-222307 filed Aug. 17, 2006, No. 2006-231621 filed Aug. 29, 2006, and No. 2006-231553 filed Aug. 29, 2006. The entire contents of the priority applications are incorporated herein by references.

BACKGROUND OF THE INVENTION

1. Field of the Invention

The invention relates to an image processing device and a storage medium storing an image processing program, and more specifically to an image processing device and a storage medium storing an image processing program that performs a Retinex process on an image.

2. Description of the Related Art

When taking a photograph of a subject under backlit conditions, e.g. against the sun, the image of the subject portion is an indistinct backlit image with low lightness and contrast, making it difficult to make out details of the subject. Image processing is performed to improve the quality of these backlit images, as well as images suffering in quality due to overexposure, underexposure, blurring due to jiggling when capturing the image, noise, insufficient light, and the like, in order to improve lightness and contrast in the image. One method used in conventional image processing is a Retinex process.

The Retinex process preserves the input image data for high-quality regions and improves the image quality primarily in low-quality regions. The Retinex process uses Gaussian filters for calibrating pixel data in the original image to values reflecting data of surrounding pixels, calculates reference component data for the original image from the natural logarithm of the calibrated pixel data, and calculates luminance component data by dividing pixel data of the original image by pixel components of the original image. Specifically, this process divides the original image into reference components and luminance components. Next, a process is performed to calibrate the brightness and level (contrast) of the luminance component through gamma correction or the like and subsequently generates improved image data for the original image in backlit portions and the like by combining the calibrated luminance components with the reference components. The reference component is found by normalizing a reflectance R(x, y).

U.S. Pat. No. 6,885,482 (corresponding to Japanese Patent Application Publication No. 2001-69525) discloses a method of converting RGB values to a color space configured of a luminance component and chromatic components, such as YCbCr or YIQ, performing the Retinex process only on the luminance component Y, while maintaining the chromatic components, and converting the values back to RGB. Calibrating only the luminance component (i.e. not calibrating the chromatic components) prevents an upset in the color balance and a shift in color. Further, since the Retinex process is performed only on the luminance component, this method requires fewer calculations than a method for performing the Retinex process on each RGB plane and, hence, can complete the process quicker. Further, less storage space is required for normalizing reflectance R(x, y) values since only the luminance value is stored, rather than each RGB value.

U.S. Patent Application Publication No. 2004/0091164 (corresponding to Japanese Patent No. 3,731,577) discloses a method for improving the processing speed in the Retinex process. This method forms a reduced image (low-resolution image) from the original image using the average pixel method or the like, forms a peripheral average luminance image (blurred image) by finding the surrounding average luminance for each pixel in the reduced image, forms a Retinex processed image from the original image and an image produced by expanding the blurred image, and forms an output image from the original image and the Retinex processed image.

SUMMARY

However, in the Retinex processes disclosed in the above reference documents, reflectance R(x, y) values must be stored for all pixels in order to find a clipped region between the UpR and DownR. Further, reflectance R(x, y) values must be stored with decimal points, since the values are found using logarithmic calculations. When the above processing is performed on a personal computer, for example, the computer must store four bytes per pixel in the floating point format or eight bytes per pixel in the double-precision floating point format since the CPU and operating system of a common personal computer processes data in 32-bit units. Consequently, an enormous amount of storage capacity is necessary for storing reflectance R(x, y) values found through logarithmic computations. Further, since the number of logarithmic computations on the reflectance R(x, y) increases according to the volume of reflectance R(x, y) data, the length of time required before the computer can begin outputting the processed image increases according to the size of the original image.

Further, since the size of the memory storing the reflectance R(x, y) is the same size as the original image, the size of the memory storing reflectance increases as the original image increases in size. Further, since the volume of reflectance R(x, y) data increases as the size of the original image increases, the number of logarithmic computations on reflectance R(x, y) data also increases, requiring a greater length of time before the computer can begin outputting the processed image.

In view of the foregoing, it is an object of the invention to provide an image processing device and a storage medium storing an image processing program that is capable of performing the Retinex process at a high speed.

In order to attain the above and other objects, the invention provides an image processing device including a reduced-image creating portion, a reduced-retinex-image forming portion, a normalizing-parameter setting portion, and an original-image correcting portion. The reduced-image creating portion creates a reduced image from an original image. The reduced-retinex-image forming portion calculates reflectance of each pixel in the reduced image based both on a pixel value of a subject pixel in the reduced image and on a peripheral average luminance of the subject pixel, thereby forming a reduced retinex image that is configured of reflectance of each pixel in the reduced image. The normalizing-parameter setting portion obtains frequencies of the reflectance in the reduced retinex image and sets an upper limit and a lower limit for normalization. The original-image correcting portion includes a retinex-image forming portion, a first normalizing portion, and a first correcting portion. The retinex-image forming portion calculates reflectance of each pixel in the original image based both on a pixel value of a subject pixel in the original image and on a peripheral average luminance of the subject pixel. The first normalizing portion normalizes the reflectance of the original image based on the upper limit and the lower limit, thereby obtaining a normalized reflectance for each pixel in the original image. The first correcting portion corrects the original image based both on the normalized reflectance and on the pixel value for each pixel in the original image, thereby obtaining a corrected original image.

According to another aspect, the invention also provides a storage medium storing an image processing program. A storage medium storing a set of program instructions executable on an image processing device, the set of program instructions includes:

creating a reduced image from an original image;

calculating reflectance of each pixel in the reduced image based both on a pixel value of a subject pixel in the reduced image and on an peripheral average luminance of the subject pixel, thereby forming a reduced retinex image that is configured of reflectance of each pixel in the reduced image;

obtaining frequencies of the reflectance in the reduced retinex image and setting an upper limit and a lower limit for normalization;

calculating reflectance of each pixel in the original image based both on a pixel value of a subject pixel in the original image and on a peripheral average luminance of the subject pixel;

normalizing the reflectance of the original image based on the upper limit and the lower limit, thereby obtaining a normalized reflectance for each pixel in the original image; and correcting the original image based both on the normalized reflectance and on the pixel value for each pixel in the original image, thereby obtaining a corrected original image.

According to another aspect, the invention also provides a storage medium storing an image processing program. An image processing method includes:

creating a reduced image from an original image;

calculating reflectance of each pixel in the reduced image based both on a pixel value of a subject pixel in the reduced image and on an peripheral average luminance of the subject pixel, thereby forming a reduced retinex image that is configured of reflectance of each pixel in the reduced image;

obtaining frequencies of the reflectance in the reduced retinex image and setting an upper limit and a lower limit for normalization;

calculating reflectance of each pixel in the original image based both on a pixel value of a subject pixel in the original image and on a peripheral average luminance of the subject pixel;

normalizing the reflectance of the original image based on the upper limit and the lower limit, thereby obtaining a normalized reflectance for each pixel in the original image; and correcting the original image based both on the normalized reflectance and on the pixel value for each pixel in the original image, thereby obtaining a corrected original image.

DETAILED DESCRIPTION

Figure 1:
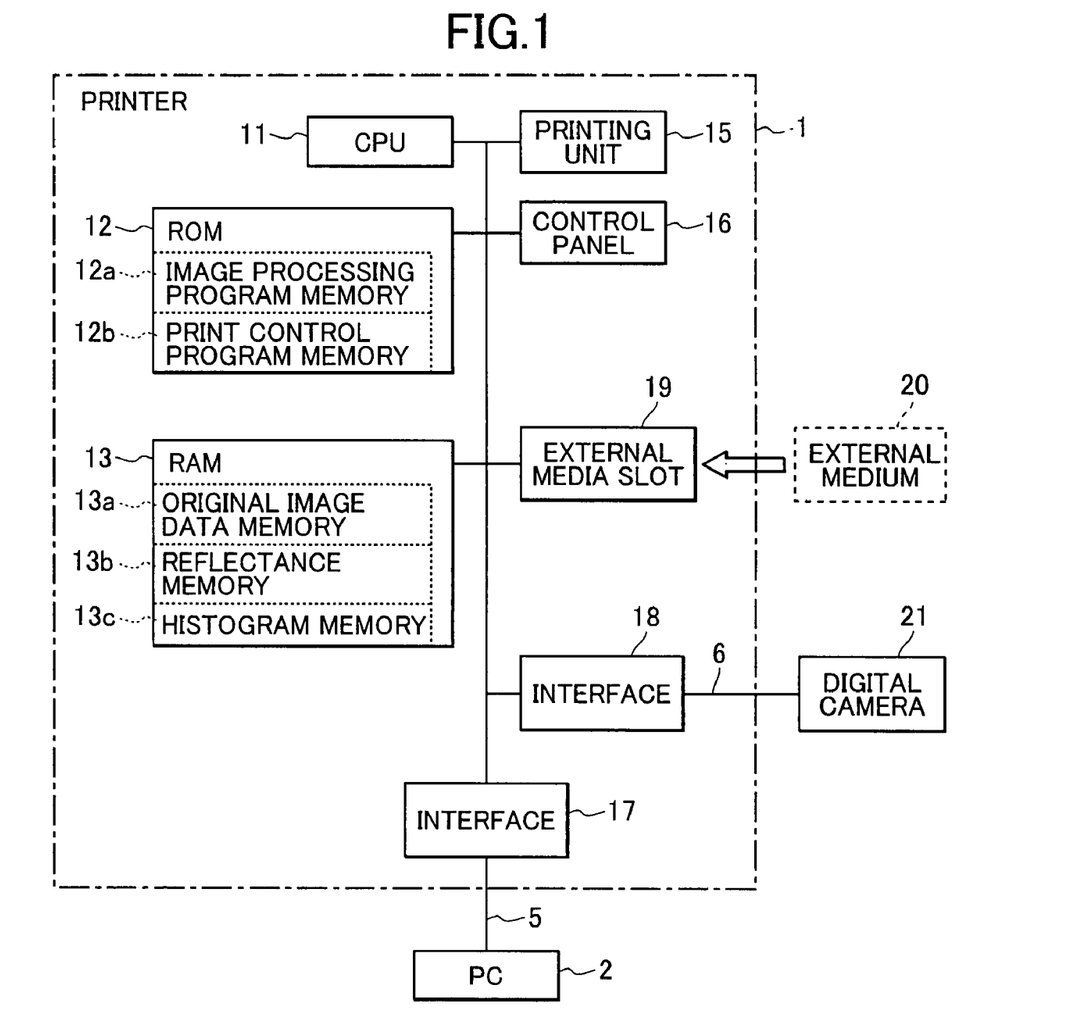
FIG. 1 is a block diagram showing the electrical structure of a printer having an image processing program according to an embodiment of the invention.

An image processing device and a storage medium storing an image processing program according to a first embodiment of the invention will be described. FIG. 1 is a block diagram showing the electrical structure of a printer 1 having a function for performing an image process according to the first embodiment. In the first embodiment, the printer 1 is connected to a personal computer (hereinafter referred to as a "PC") 2, a digital camera 21, and/or an external medium 20. An image processing program installed on the printer 1 executes a Retinex process and a histogram process on image data (image data for an original document or the like) inputted from the PC 2, digital camera 21, or external medium 20. The image processing program corrects low-quality regions of the image data, such as backlit image regions.

As shown in FIG. 1, the printer 1 includes a CPU 11, a ROM 12, a RAM 13, a printing unit 15, and a control panel 16. The printing unit 15 has a print head and the like for printing out image data on a printing medium, such as paper. The control panel 16 has a user operating unit configured of a ten-key pad and the like, for example, enabling the user to input values for the size of the outputted image and the like.

The printer 1 also includes an interface 17, an interface 18, and an external media slot 19. The interface 17 is provided for connecting the printer 1 to the PC 2 with a cable 5. The interface 18 is provided for connecting the printer 1 to the digital camera 21 with a cable 6. The external media slot 19 allows the user to detachably mount the external medium 20 in the printer 1, the external medium 20 being an SD card or a Memory Stick, for example. The interfaces 17 and 18 use the Universal Serial Bus (USB) communication method.

Accordingly, image data stored on the PC 2 can be inputted into the printer 1 via the cable 5 and the interface 17, while image data captured by the digital camera 21 can be inputted into the printer 1 via the cable 6 and the interface 18. Further, image data stored on the external medium 20 can be inputted into the printer 1 when the external medium 20 is mounted in the external media slot 19.

The CPU 11 is an arithmetic processor that controls the overall operations of the printer 1. The ROM 12 stores various control programs executed by the CPU 11 and fixed values used when the CPU 11 executes programs. The ROM 12 includes an image processing program memory 12a, and a print control program memory 12b. The image processing program memory 12a stores the image processing program for performing such image processing as the Retinex process and the histogram process. The print control program memory 12b stores a print control program for executing a printing operation.

The RAM 13 is a rewritable random access memory that includes a work area for storing a set of registers required when the CPU 11 executes the control programs, and a temporary area for temporarily storing data during such processes. The RAM 13 also includes an original image data memory 13a, a reflectance memory 13b (reduced-retinex-image memory), and a histogram memory 13c. The original image data memory 13a stores original image data. The reflectance memory 13b stores reflectance values that are obtained by reducing an original image and performing the Retinex process of the reduced image. The histogram memory 13c stores frequencies of pixel values of each pixel in the histogram process.

The original image data memory 13a stores image data inputted from the PC 2, digital camera 21, and external medium 20 via the interface 17, interface 18, and external media slot 19, respectively. In the embodiment, the original image data and output image data are configured of RGB values, each of which is a value in the range 0-255.

Specifically, the RGB values include components representing the three primary colors of light, i.e. an R value representing red, a G value representing green, and a B value representing blue. Together, the R, G, and B values are collectively referred to as a pixel value P. The combination of RGB values for each pixel of an input image indicates one color (hue, tone, etc.). The greater the RGB values, the higher the luminance (brightness).

The reflectance memory 13b is a memory area used in the Retinex process for storing reflectances Rs(x, y) obtained from luminance values of the original image after the original image is compressed (reduced). The original image is compressed according to a method well known in the art, such as the nearest neighbor method for sampling a value of a pixel nearest a position of the original image corresponding to a pixel of the reduced image and for using the sampled pixel value, or the bi-cubic method or average pixel method for performing interpolation using pixels surrounding a position in the original image corresponding to a pixel of the reduced image. The nearest neighbor method is used when processing speed is given priority over image quality, and the bi-cubic method or average pixel method is used when giving priority to image quality over processing speed. Accordingly, an upper limit Us and a lower limit Ds of the clipped range (normalizing parameters) described later can be accurately set when using the bi-cubic method or the average pixel method.

The original image is compressed according to one of these methods, and the reflectance for each pixel in the reduced image is calculated using equation 2 described later. The calculated reflectance values are stored in the reflectance memory 13b.

The histogram memory 13c stores a histogram for setting the clipped range used when normalizing reflectance R(x, y) values.

Figure 2:
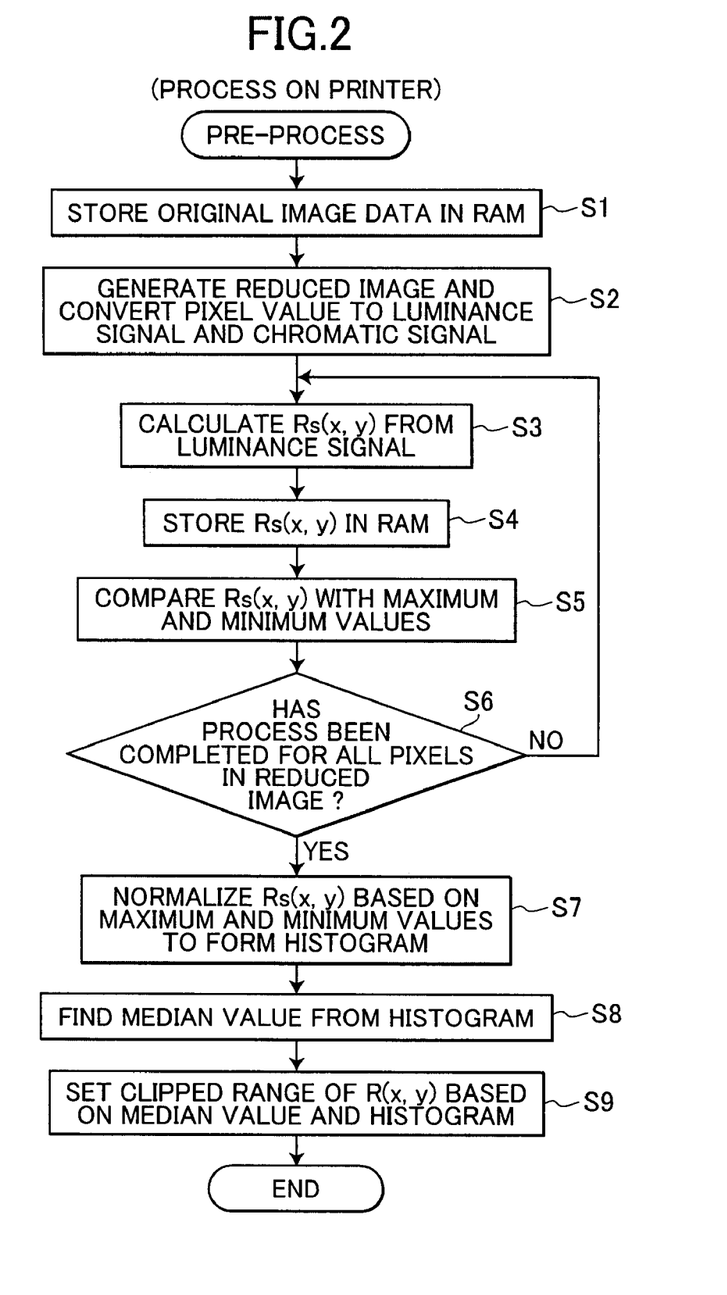
FIG. 2 is a flowchart illustrating steps in a pre-process of an image processing program executed by the printer according to the first embodiment.
Figure 3:
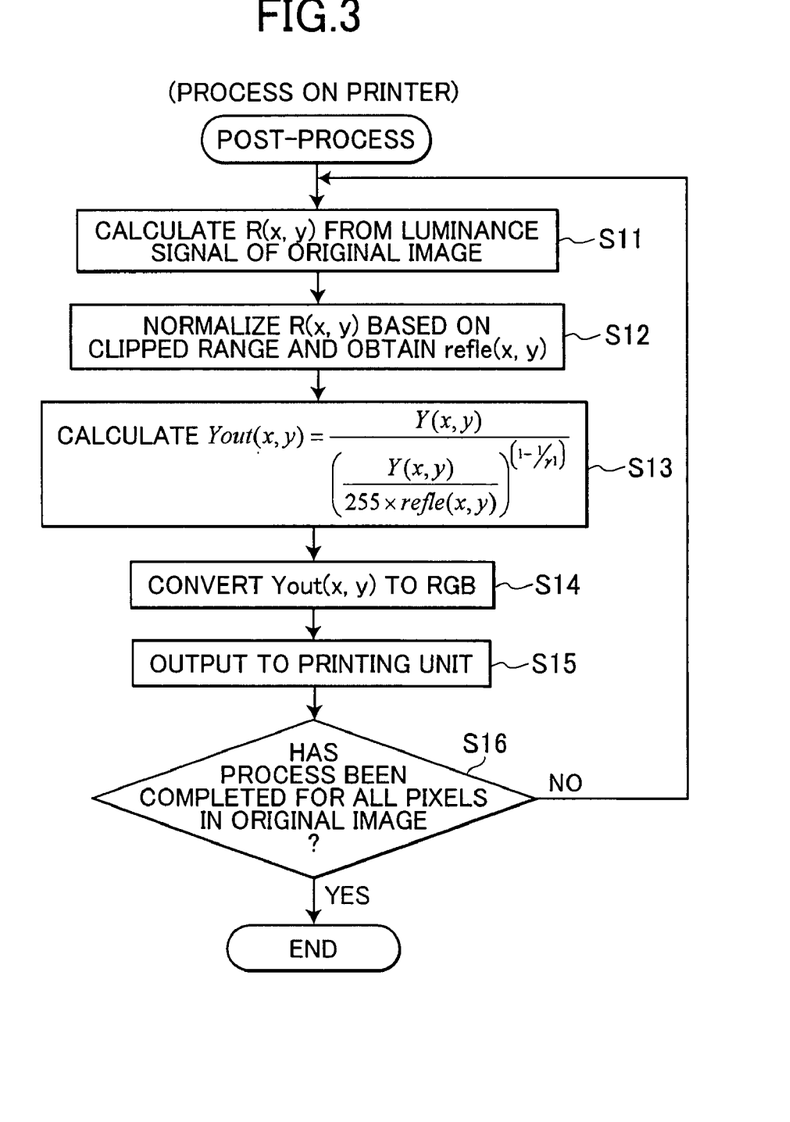
FIG. 3 is a flowchart illustrating steps in a post-process executed after the pre-process of the image processing program according to the first embodiment.

Next, an image process executed by the CPU 11 according to the image processing program stored in the image processing program memory 12a will be described with reference to FIGS. 2 and 3. In the embodiment, the CPU 11 performs a Retinex process on luminance signals for the original image. FIGS. 2 and 3 are flowcharts illustrating steps in this image process. The process shown in FIG. 2 will be referred to as a pre-process. In the pre-process, the CPU 11 sets a clipped range for normalizing reflectance R of the original image (S11 in FIG. 3). The image is not outputted while the preprocess is executed.

In S1 of the pre-process shown in FIG. 2, the CPU 11 reads original image data from the PC 2 or digital camera 21 and stores this data in the original image data memory 13a of the RAM 13. In S2 the CPU 11 generates a reduced image by compressing the original image and converts RGB values for each pixel in the reduced image to a luminance value (luminance signal) Y and chromatic values (chromatic signals) Cb and Cr.

The nearest neighbor method or average pixel method is used for generating the reduced image, and the following equation is used to calculate the luminance signal Y and the chromatic signals Cb and Cr.

$$\begin{pmatrix} Y \\ Cr \\ Cb \end{pmatrix} = \begin{pmatrix} 0.30 & 0.59 & 0.11 \\ 0.60 & -0.28 & -0.32 \\ -0.21 & -0.52 & 0.31 \end{pmatrix} \begin{pmatrix} R \\ G \\ B \end{pmatrix}$$ [Equation 1]

The luminance signal Y and chromatic signals Cb and Cr calculated above may be temporarily stored in the RAM 13 or the like to be used in subsequent processes. However, if it is desirable to reduce the storage volume, these values may be calculated in the above equation by reading pixel values from the original image as needed without storing the values in memory.

In S3 the CPU 11 calculates a reflectance Rs (x, y) from the luminance value Y calculated above for each pixel in the reduced image. Here, the "s" is added to the end of symbols for indicating the reduced image as opposed to the original image. The reflectance Rs(x, y) is calculated according to the following equation, where Ys(x, y) is the luminance value of the pixel in the reduced image, and Fs(x, y) is the filter for the reduced image.

$$Rs(x, y) = \log \frac{Ys(x, y)}{Fs(x, y) * Ys(x, y)}$$ [Equation 2]

In equation 3, x is the horizontal coordinate, y is the vertical coordinate, Ys(x, y) is the luminance value of the pixel at the coordinate (x, y), "*" is the convolution operator. Further, log is the natural logarithm to the base e. Fs(x, y) represents a Gaussian filter factor at the subject pixel (x, y) as shown in the following equation:

$$Fs(x,y) = \exp(-(x^2+y^2)/(c/75)^2)$$ [Equation 3]

where c is a coefficient determined dependently on the number of the peripheral pixels. So, the value Fs(x, y)*Ys(x, y) indicates the average value of the luminance values of the peripheral pixels.

In S4 the CPU 11 stores the reflectance Rs(x, y) found in the above calculations in the reflectance memory 13b of the RAM 13.

In S5 the CPU 11 compares the reflectance Rs(x, y) obtained in S4 to maximum and minimum values of reflectance Rs(x, y) values obtained thus far. Specifically, both of the maximum and minimum values are temporarily set to the reflectance Rs(x, y) found for the first-calculated pixel. All reflectance Rs(x, y) values subsequently obtained are compared with the current maximum and minimum values. If the current reflectance Rs(x, y) is greater than the maximum value, then this reflectance Rs(x, y) is set as the new maximum value. Similarly, if the current reflectance Rs(x, y) is less than the minimum value, then this reflectance Rs(x, y) is set as the new minimum value. When the current reflectance Rs(x, y) is less than or equal to the maximum value and greater than or equal to the minimum value, the maximum and minimum values remain unchanged.

Figure 4:
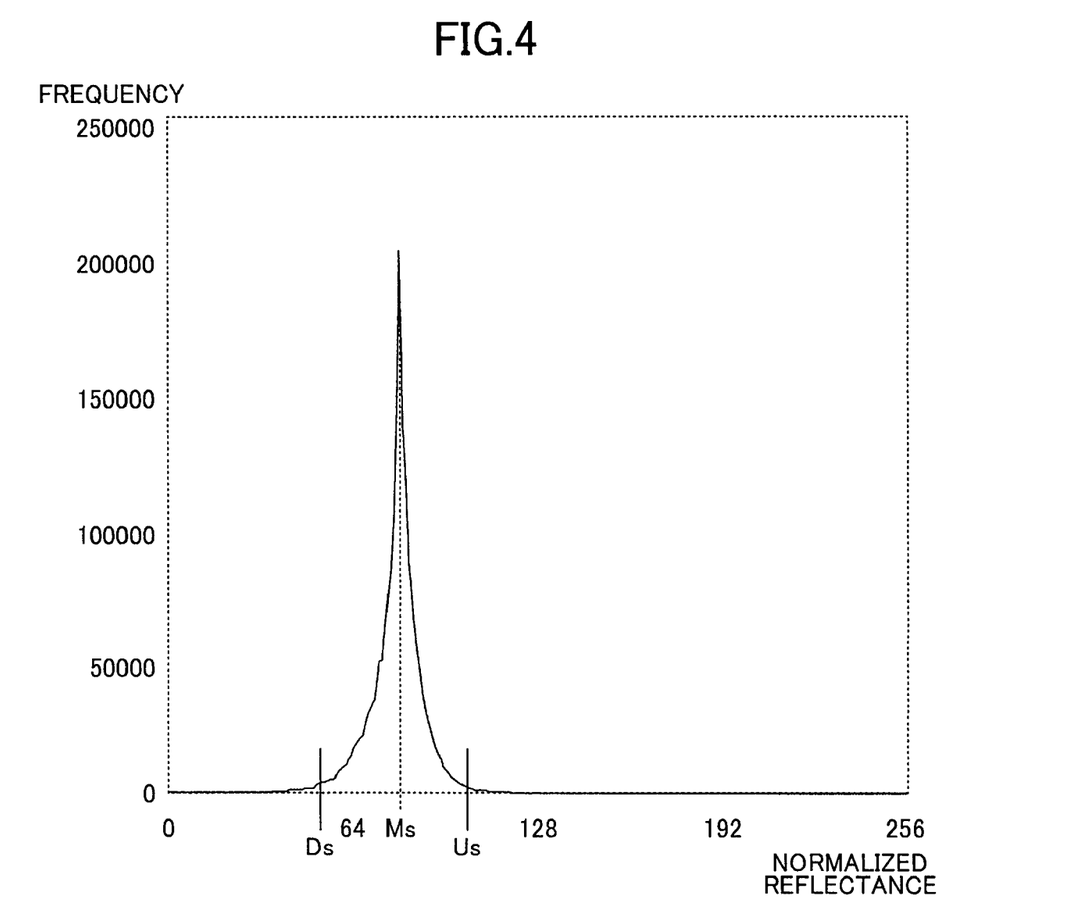
FIG. 4 is a histogram illustrating a clipped range used for normalization of reflectance R(x, y)

In S6 the CPU 11 determines whether the process in S3-S5 has been completed for all coordinates in the reduced image. If unprocessed coordinates remain (S6: NO), the CPU 11 returns to S3. However, if the process has been completed for all coordinates (S6: YES), then in S7 the CPU 11 normalizes the reflectance Rs(x, y) values based on the maximum and minimum values obtained in S5 to form a histogram. Normalization is achieved by setting the minimum reflectance Rs(x, y) among all coordinates to 0 and the maximum value to 255 and linearly setting all reflectance Rs(x, y) values for other coordinates to integers between 0 and 255. The histogram is formed in the histogram memory 13c by tabulating the frequency of pixels indicating each computed value between the maximum and minimum values. An example of the histogram is shown in FIG. 4.

In S8 the CPU 11 finds a median value Ms from the histogram formed in S7. In S9 the CPU 11 sets a clipped range of reflectance Rs(x, y) values (normalizing parameters) based on the median value Ms and the histogram. As an example, the clipped range has an upper limit Us including 45% of all samplings greater than the median value Ms, and a lower limit Ds including 45% of all samplings smaller than the median value Ms. The reflectance Rs(x, y) values corresponding to the upper limit Us and lower limit Ds are called the UpR and DownR values, respectively. In this way, a clipped range (UpR, DownR) is obtained.

In the pre-process described above, the CPU 11 forms a Retinex image configured by the reflectance of the reduced image obtained by compressing the original image and finds the clipped range (normalizing parameters) for normalizing the reflectance of the original image from the Retinex image. Since the clipped range is found based on the reflectance of the reduced image, it is possible to drastically reduce the number of operations for finding the clipped range from the number of operations required to find the clipped range from the original image, thereby increasing the processing speed. Further, a smaller storage space is required for storing Retinex image (reflectance) of the reduced image than for storing Retinex image of the original image.

Further, there is no great difference between the clipped range found using reflectance values of the reduced image and a clipped range found using reflectance values of the original image. The following table shows the differences between the clipped range (upper limit and lower limit) found based on the reflectance of the reduced image and the clipped range found based on the reflectance of the original image.

TABLE 1

| | Clipped range | | Maximum/Minimum values | |
|---|---|---|---|---|
| | Upper limit | Lower limit | Maximum value | Minimum value |
| Original image | 0.825 | −0.822 | 2.712 | −4.063 |
| Reduced image | 0.742 | −0.755 | 1.729 | −2.607 |
| Difference | 0.083 | 0.067 | 0.983 | 1.456 |

As shown in Table 1, the maximum value of normalized reflectance values for the original image is 2.712, and the minimum value −4.063, while the maximum value of normalized reflectance values for the reduced image is 1.729, and the minimum value −2.607. Hence, the difference between the maximum normalized reflectance for the original image and the maximum normalized reflectance for the reduced image is 0.983, and the difference between the minimum normalized reflectance for the original image and the minimum normalized reflectance for the reduced image is 1.456. These differences are considerably large.

However, the upper limit of the clipped range found based on the reflectance values of the original image is 0.825 and the lower limit −0.822, while the upper limit found based on the reflectance values of the reduced image is 0.742 and the lower limit −0.755. Hence, the difference between the upper limit of normalized reflectance values for the original image and the upper limit of normalized reflectance values for the reduced image is 0.083, while the difference between the lower limit of normalized reflectance values for the original image and the lower limit of normalized reflectance values for the reduced image is 0.067. These differences are small.

Next, a post-process performed based on the clipped range found in the pre-process of FIG. 2 will be described with reference to FIG. 3. The post-process is a Retinex process performed on the original image. FIG. 3 is a flowchart illustrating steps in the Retinex process. The post-process is performed on each pixel in the original image and sequentially outputs processed pixel values (RGB values) to the printing unit 15.

In S11 at the beginning of the process, the CPU 11 finds luminance values Y and chromatic values Cr and Cb for pixels in the original image according to the above-described equation 1, and calculates the reflectance R(x, y) for the luminance values according to following equation.

$$R(x, y) = \log \frac{Y(x, y)}{F(x, y) * Y(x, y)} \qquad \text{[Equation 4]}$$

In S12 the CPU 11 normalizes the reflectance R(x, y) values stored in the reflectance memory 13b within the clipped range (UpR, DownR) found in S9 using the reduced image, in order to find normalized reflectance (normalized Retinex value) refle(x, y). The normalized reflectance refle(x, y) is set to 0.0 when the value of reflectance R(x, y) is less than or equal to the DownR, is set to 1.0 when the value of reflectance R(x, y) is greater than or equal to UpR, and is calculated based on the following equation 5 when the value of reflectance R(x, y) is greater than DownR and less than UpR.

$$refle(x, y) = \frac{R(x, y) - DownR}{UpR - DownR} \qquad \text{[Equation 5]}$$

Through this process, refle(x, y) is normalized to a value between 0.0 and 1.0. Through experimentation, it has been found preferable to add 0.3 to this value to obtain a value between 0.3 and 1.3 for refle(x, y).

In S13 the CPU 11 finds an output luminance value Yout(x, y) according to equation 6 show below. In other words, the CPU 11 performs the Retinex process on the luminance value for each pixel using refle(x, y). In equation 6, γ1 is a gamma constant and normally set to 1.5.

$$Yout(x, y) = \frac{Y(x, y)}{\left(\frac{Y(x, y)}{255 \times refle(x, y)}\right)^{(1-1/\gamma 1)}} \qquad \text{[Equation 6]}$$

In S14 the CPU 11 converts YCbCr values to RGB values based on equation 7 shown below. Yout in equation 7 corresponds to Yout(x, y) in equation 6. Cr and Cb in equation 7 correspond to Cr and Cb found in S11. Cb and Cr are stored in the RAM 13. Note that a coordinate (x, y) is omitted in equation 7 for simplification. The RGB values obtained in S14 are the result of performing the Retinex process on the RGB values of the original image.

$$\begin{pmatrix} R \\ G \\ B \end{pmatrix} = \begin{pmatrix} 1.00 & 0 & 1.37 \\ 1.00 & -0.34 & -0.70 \\ 1.00 & 1.73 & 0 \end{pmatrix} \begin{pmatrix} Yout \\ Cr \\ Cb \end{pmatrix}$$ [Equation 7]

In the process described above, the CPU 11 executes the Retinex process on a luminance signal for the original image and finds pixel values by converting the chromatic signals back to RGB values. In S15 the CPU 11 outputs the processed pixel values to the printing unit 15. Hence, by identifying the clipped range for performing normalization in the pre-process, the CPU 11 can sequentially process each pixel and output the results to the printing unit 15 in the post-process, thereby reducing the time from the start of image processing to the start of the printing operation.

In S16 the CPU 11 determines whether the above process has been completed for all pixels in the original image. If some unprocessed pixels remain (S16: NO), then the CPU 11 returns to S11. However, if the process has been completed for all pixels (S16: YES), then the CPU 11 ends the post-process.

In the preferred embodiment described above, the printer 1 finds reflectance values for luminance signals of the reduced image obtained by compressing the original image and finds a clipped range from the reflectance values. Next, the printer 1 performs the Retinex process on the original image based on the clipped range. Hence, the printer 1 according to the preferred embodiment can reduce the number of times to perform convolution calculations when finding the peripheral average luminance (F(x, y)*Y(x, y)), thereby increasing the processing speed. Further, by reducing the number of pixels (number of reflectance values) targeted when finding the clipped range, the printer 1 can reduce the memory storage space required for storing the reflectance values, further increasing the processing speed for finding the clipped range. Further, since the printer 1 finds the clipped range in the pre-process and, in the ensuing post-process, sequentially performs the Retinex process on each pixel of the original image based on the clipped range found in the pre-process and outputs the resulting image, the printer 1 can reduce the time from the start of image processing to the start of outputting the image (the time of the process based on the image processing program).

Further, since the Retinex process is performed based on luminance signals of the reduced image and the original image, the printer 1 can more reliably prevent color shifts and can reduce the number of times to perform calculations compared to the method of performing the Retinex process on each RGB value, thereby increasing the processing speed. Further, since the upper and lower limits found based on the reduced image are substantially identical to the upper and lower limits found based on the original image, the printer 1 can increase the speed of the process executed based on the image processing program while maintaining the precision of the upper and lower limits.

Next, an image processing device and a storage medium storing an image processing program according to a second embodiment of the present invention will be described while referring to the accompanying drawings. In the second embodiment, the histogram process is performed after performing the Retinex process according to the first embodiment (FIG. 3). The histogram process is performed because in some cases the dynamic range is too small or dark regions are too light, resulting in an unnatural image produced from the Retinex process. Performing the histogram process after the Retinex process improves the image quality. Specifically, parameters are set for the histogram process after performing the preprocess described in FIG. 2, and the histogram process is performed after performing the post-process described in FIG. 3. Next, a pre-process and post-process executed on the image processing device according to the second embodiment will be described.

<Histogram Process>

Figure 5A:
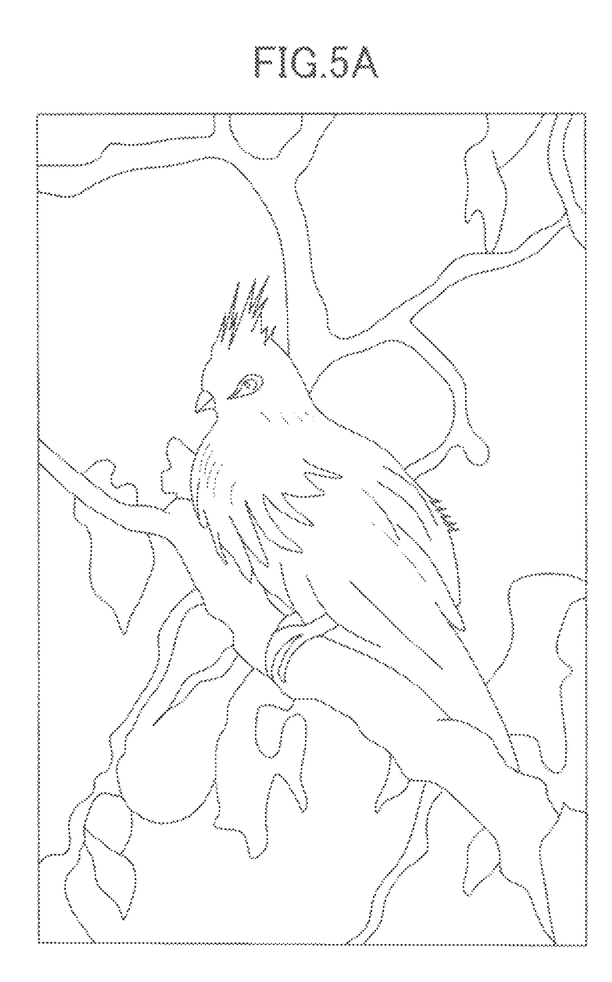
FIG. 5A shows an example image used to illustrate a histogram process of the embodiment.
Figure 5B:
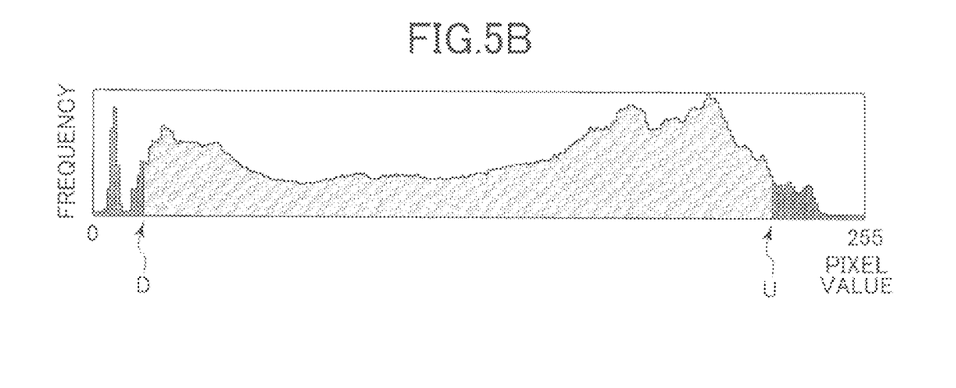
FIG. 5B is a histogram indicating pixel values of the image shown in FIG. 5A.

A histogram process will be described with reference to FIGS. 5A and 5B. The histogram process will be used in a post-process described later with reference to FIG. 7. FIG. 5A shows an example original image. FIG. 5B is a histogram formed from the original image shown in FIG. 5A. This histogram tabulates the number of pixels in the image having RGB values that indicate each integer 0-255, i.e. the frequency at which RGB values indicate each integer. In the case of color images, i.e. when each RGB value is represented by 8 bits, or a value from 0 to 255, each integer from 0 to 255 is tabulated by adding one for each pixel having an RGB value that matches the integer. For example, if the RGB values for a certain pixel are (100, 200, 200), then a "1" is added to the tabulation for the value 100 and a "2" is added to the tabulation for the value 200. The results of this tabulation are stored in the histogram memory 13c.

As shown in FIG. 5B, ratios for removing a light region and a dark region (cut ratios) are set for the histogram created above, and an upper limit U and a lower limit D are found from these ratios. For example, if each of the ratios for removing the light region and dark region is set to 3%, the upper limit U is set so that the number of pixels included in the light region from the maximum value 255 to the upper limit U corresponds to 3% of three times the total number of pixels (assuming the three values RGB for each pixel). Similarly, the lower limit D is set so that the number of pixels included in the dark region from the minimum value 0 to the lower limit D corresponds to 3% of three times the total number of pixels.

When setting the upper limit U and lower limit D in this way, values in the range from the minimum pixel value (0) to the lower limit D are set to the minimum value, and values in the range from the upper limit U to the maximum pixel value (255) are set to the maximum value. Values in the range from the lower limit D to the upper limit U are corrected with a linear or nonlinear function.

Figure 7:
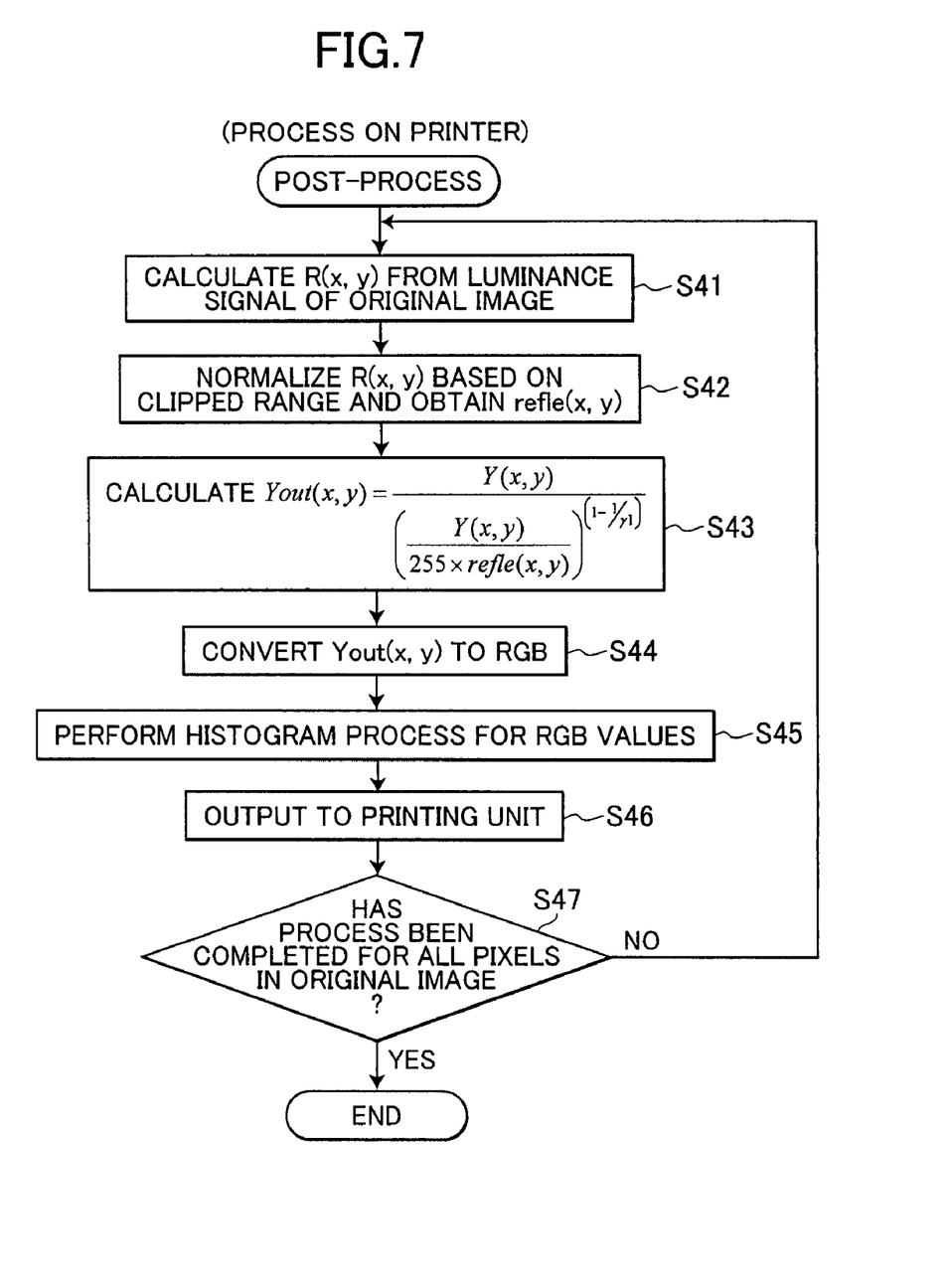
FIG. 7 is a flowchart illustrating steps in a post-process executed after the preprocess of the image processing program according to the second and third embodiment.

Specifically, if input is the inputted pixel value P (RGB value obtained in S44 of FIG. 7), output is the corrected pixel value (value obtained in S45 of FIG. 7), the pixel value P falls within a range from 0 to 255, and γ2 is a constant (γ2=1 in this embodiment), then output is set as follows:
(i) Output=0, when input is less than or equal to the lower limit D;
(ii) Output=255, when input is greater than or equal to the upper limit U; and
(iii) a value calculated from equation 8, when input is greater than the lower limit D and less than the upper limit U.

$$\text{Output} = a^{\gamma 2} \times 255$$ [Equation 8]

In equation 8, a=(input−D)/(U−D). When γ2=1, output expands linearly between the lower limit D and upper limit U.

Figure 6:
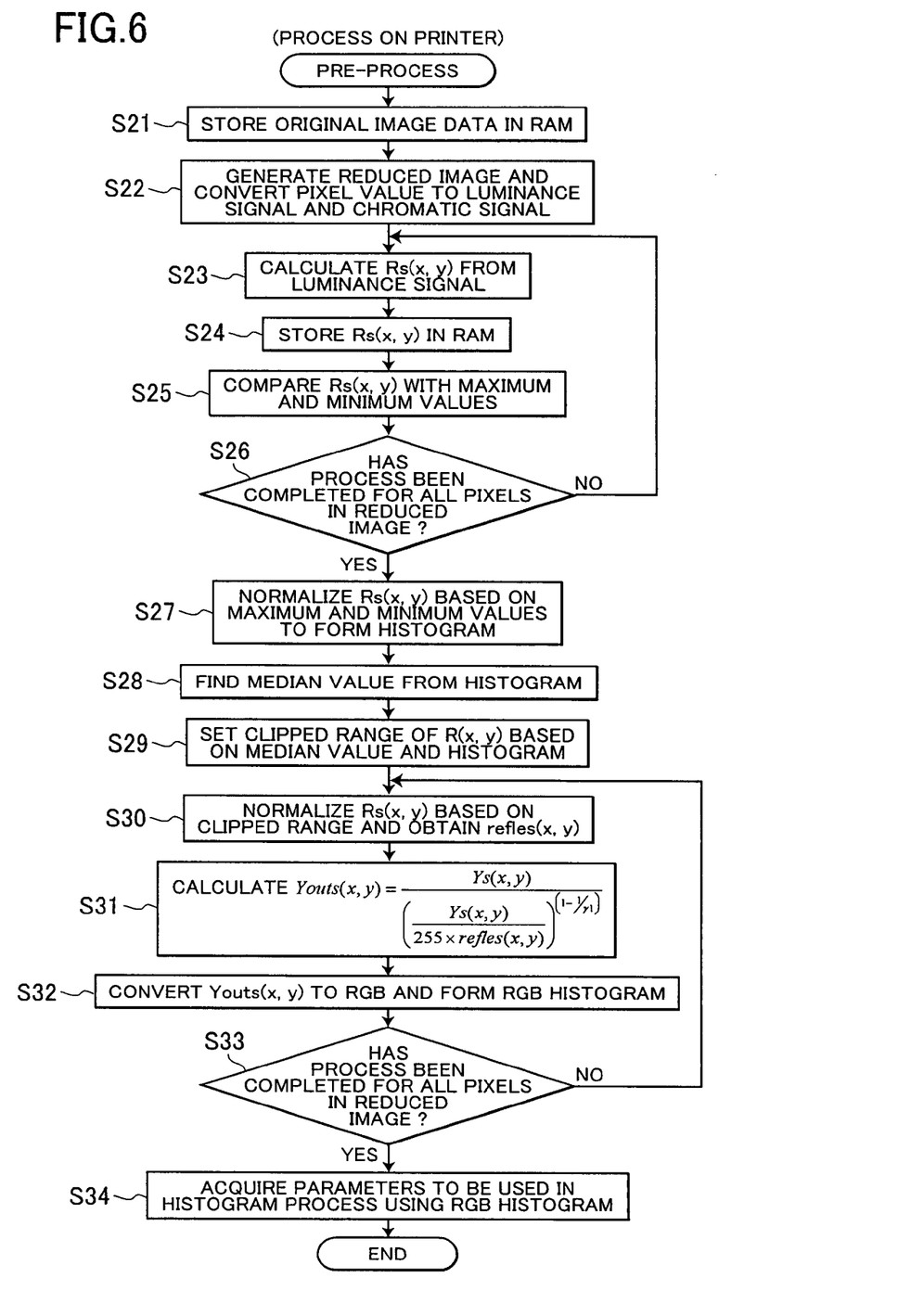
FIG. 6 is a flowchart illustrating steps in a pre-process of an image processing program executed by the printer according to a second embodiment.

Next, the pre-process according to the second embodiment will be described. FIG. 6 is a flowchart illustrating steps in the pre-process according to the second embodiment. Since steps S21-S29 in FIG. 6 are identical to steps S1-S9 in FIG. 2, a description of these steps will not be repeated.

After completing S29 in FIG. 6, in S30 the CPU 11 normalizes the reflectance Rs(x, y) values (reduced Retinex image) stored in the reflectance memory 13b within the clipped range (UpR, DownR) found in S29, and finds the refles(x, y) according to equation 9 show below.

$$refles(x, y) = \frac{Rs(x, y) - DownR}{UpR - DownR} \quad \text{[Equation 9]}$$

In S31 the CPU 11 finds an output luminance value Youts(x, y) according to equation 10. In other words, the CPU 11 performs the Retinex process on the luminance value for each pixel in the reduced image.

$$Youts(x, y) = \frac{Ys(x, y)}{\left(\frac{Ys(x, y)}{255 \times refles(x, y)}\right)^{(1-1/\gamma 1)}} \quad \text{[Equation 10]}$$

In S32 the CPU 11 converts YCbCr values to RGB values based on equation 11 shown below and records the values in the histogram. Youts in equation 11 corresponds to Youts(x, y) in equation 10. Cr and Cb in equation 11 correspond to Cr and Cb in equation 1. Note that a coordinate (x, y) is omitted in equation 11 for simplification.

$$\begin{pmatrix} R \\ G \\ B \end{pmatrix} = \begin{pmatrix} 1.00 & 0 & 1.37 \\ 1.00 & -0.34 & -0.70 \\ 1.00 & 1.73 & 0 \end{pmatrix} \begin{pmatrix} Youts \\ Cr \\ Cb \end{pmatrix} \quad \text{[Equation 11]}$$

Recording values in the histogram involves adding "1" to RGB values taking on integer values between 0 and 255 for each corresponding R value, G value, and B value obtained in S32. The incremented values are stored in the histogram memory 13c.

In S33 the CPU 11 determines whether the process from S30 to S32 has been completed for all the pixels in the reduced image. If there are still unprocessed pixels (S33: NO), then the CPU 11 returns to S30. If the process has been completed for all pixels (S33: YES), then in S34 the CPU 11 acquires parameters to be used in the histogram process from the histogram formed in the histogram memory 13c. These parameters include the constant γ2, the upper limit U, and the lower limit D. The constant γ2 is set to 1 by default. The upper limit U and the lower limit D are obtained from the histogram formed in S32, because the cut ratios for removing the light region and dark region from the histogram are set to 3% by default.

Hence, through the process described above, the CPU 11 acquires parameters for use in the histogram process performed after the Retinex process.

Next, the post-process executed after setting the parameters will be described with reference to FIG. 7. FIG. 7 is a flowchart illustrating steps in the post-process according to the second embodiment. In the post-process, the CPU 11 performs the Retinex process and the histogram process for each pixel in the original image sequentially and outputs processed values to the printing unit 15.

Since S41-S44 in the post-process of FIG. 7 are identical to S11-S14 in FIG. 3, a description of these steps has been omitted.

After completing the process in S44, in S45 the CPU 11 performs the histogram process for RGB values, that underwent the Retinex process, based on parameters obtained in S34. In S46 the CPU 11 outputs processed RGB values to the printing unit 15.

In S47 the CPU 11 determines whether the process has been completed for all pixels in the original image. If there are still unprocessed pixels (S47: NO), then the CPU 11 returns to S41. If the process has been completed for all the pixels (S47: YES), then the CPU 11 ends the post-process of FIG. 7

In the second embodiment described above, the printer 1 converts a color image to luminance signals, performs the Retinex process on the luminance signals, and reconverts the luminance signals obtained from the Retinex process to a color image before performing the histogram process. In this way, the printer 1 can broaden the dynamic range of the image to obtain an image of higher quality. The printer 1 also improves image quality by setting parameters for the histogram process based on parameters in the Retinex process.

Further, the printer 1 according to the second embodiment obtains parameters to be used in the histogram process using the reflectance values (Rs(x, y)) for the luminance signals of pixels in a reduced image. Hence, the printer 1 can reduce the number of pixels that are processed and can acquire parameters more quickly using the reflectance values of luminance signals for all pixels of the original image. Therefore, the printer 1 can reduce the time required for performing the process based on the image processing program. The printer 1 can also reduce the memory storage space required for storing results of calculations in the parameter acquiring process compared to the method for setting parameters based on the original image.

In the preferred embodiment, the printer 1 acquires normalizing parameters in the Retinex process performed on the luminance signal Y of the reduced image, as described above, and acquires parameters for the histogram process performed after the Retinex process. However, it is not necessary to process the reduced image to set parameter values if the user can set appropriate parameter values by viewing the image, or if parameter values can be determined from a similar image. In such cases, the Retinex process and histogram process can be performed sequentially on each pixel in the original image, quickly obtaining output.

Figure 8:
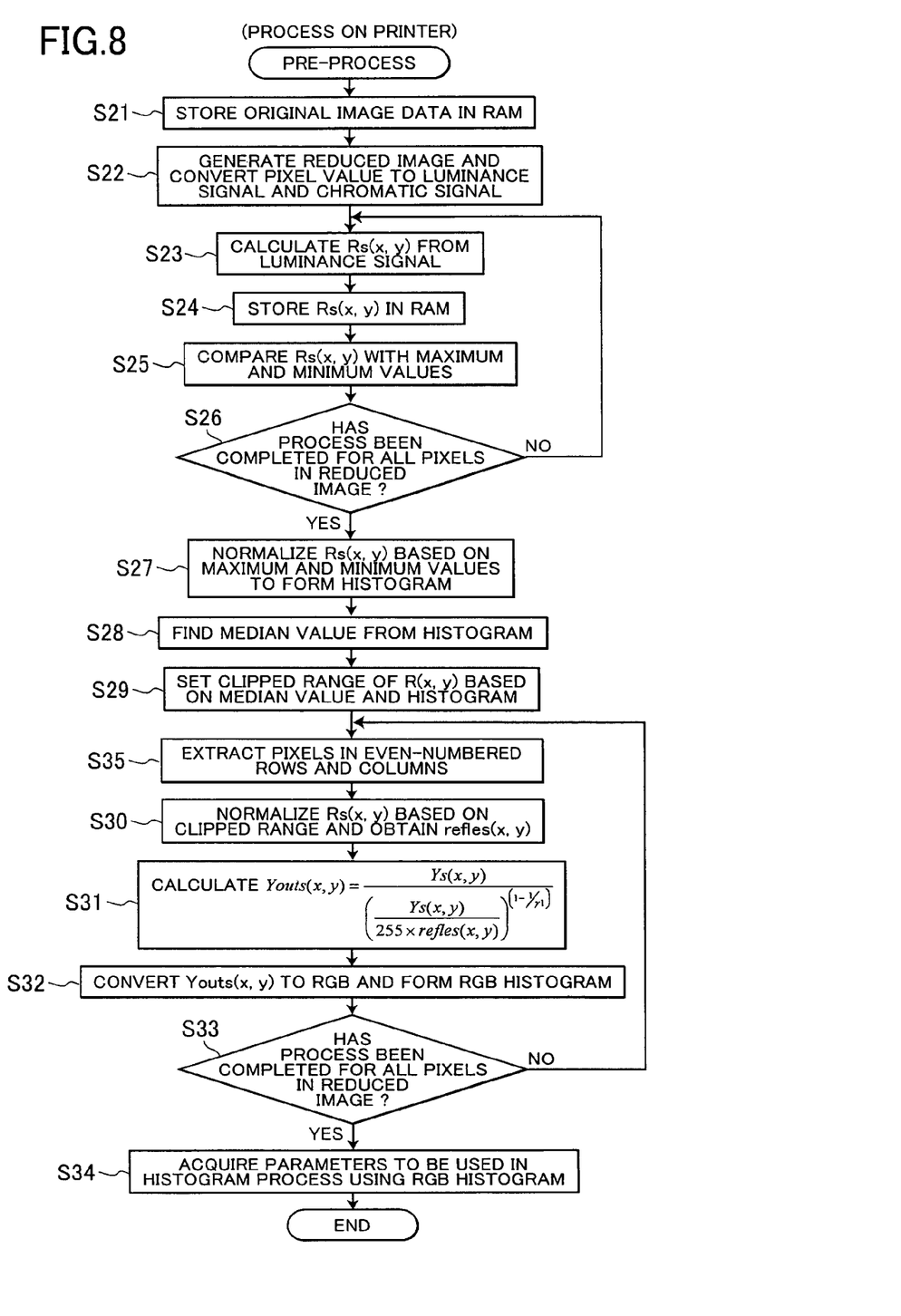
FIG. 8 is a flowchart illustrating steps in a pre-process of an image processing program executed by the image processor according to a third embodiment.

Next, an image processing device and a storage medium storing an image processing program according to a third embodiment of the present invention will be described with reference to FIGS. 7 and 8. FIGS. 7 and 8 are flowcharts illustrating steps in a post-process and a pre-process executed by the image-forming device according to the third embodiment. The pre-process shown in FIG. 8 is identical to steps S21-S34 of FIG. 6, except for the process in S35 added after S29. Therefore, only the process in S35 will be described below. Further, since the post-process in the third embodiment is identical to that in the second embodiment (S41-S47 in FIG. 7), a description of this process has been omitted.

In S35 of FIG. 8, the CPU 11 extracts (samples) reflectance Rs(x, y) values stored in the reflectance memory 13b corresponding to pixels having even-numbered rows and columns (x and y values) based on the clipped range found in S29.

The reflectance Rs(x, y) values of pixels may be extracted according to a predetermined method of high regularity (such as the method of using even-numbered rows and columns in the preferred embodiment), or according to a random sampling method for sampling different positions based on a random number. When performing highly regular sampling, there is a great potential for error in the sampled data if the sampling regularity matches the regularity of the image data (striped patterns or the like in the image, for example). The potential for such errors occurring due to the type of image data is lower when the sampling position is randomly chosen for each extraction.

Next, the CPU 11 normalizes the reflectance Rs(x, y) values of the pixels extracted in S35 based on the clipped range found in S29, and finds the refles(x, y) and Youts(x, y) (S30, S31).

By acquiring parameters for use in the histogram process using only reflectance Rs(x, y) values for a prescribed plurality of pixels in the reduced image, the printer 1 according to the third embodiment can further reduce the number of pixels to be processed, thereby more quickly acquiring parameters than an acquisition process using the reflectance Rs(x, y) values for all pixels of the original image. Therefore, the printer 1 can reduce the time required for the process based on the image processing program. The printer 1 can also further reduce the memory storage space required for storing results of calculations in the parameter acquiring process compared to the method for setting parameters based on the original image. Parameters set for the histogram process using the reduced image show very little difference from parameters using the original image.

While the invention has been described in detail with reference to the above aspects thereof, it would be apparent to those skilled in the art that various changes and modifications may be made therein without departing from the spirit of the invention.

In the above-described embodiment, the lower limit D used in the histogram process is set so that the number of pixels included in the dark region corresponds to 3% of three times the total number of pixels. However, the lower limit D may be set according to the value of $\gamma 1$ in equation 9 of the Retinex process. The image is corrected to be brighter when the value of $\gamma 1$ is larger and corrected less when the value of $\gamma 1$ is smaller. Hence, when $\gamma 1$ is large, the value of the lower limit D is increased (the cut ratio or amount of the dark region that is cut is increased). In this way, the bright region of a resultant image can be emphasized by shifting the pixel values to the darker side as a whole through the histogram process.

In the above-described embodiment, the value of $\gamma 2$ used in the histogram process is set to 1 by default. However, the value of $\gamma 2$ may be set as follows. The Retinex process corrects backlit portions and the like, but also corrects the overall image to be brighter, giving a different impression from the original image. By applying gamma correction in the histogram process opposite the gamma correction used for adjusting the luminance in the Retinex process, it is possible to restore regions that are too bright to a natural state. Hence, the value of $\gamma 2$ may be found according to the following equation based on a constant $\gamma 1$ used for gamma correction in the Retinex process (equation 9). Specifically, $\gamma 2$ can be found from equation:

$$\gamma 2 = (\gamma 1 - 1.0)/A + 1.0$$

where A is a value between 5 and 20.

Alternatively, the value of $\gamma 2$ may be set so that the median value after the Retinex process approaches the median value prior to the Retinex process. If input is the pixel value, output is the corrected pixel value, B is the overall range of pixel values, MAX is the maximum value of the overall range, MIN is the minimum value of the overall range, D is an upper limit of a lower range, U is a lower limit of an upper range, OM is the median value of the original image, RM is the median value of the image processed in the Retinex process described above, and $\alpha$ is a constant, output is set as follows:
output=MIN, when input is in the lower range (less than D);
output=MAX, when input is in the upper range (greater than U); and
output=a value derived from equation 12 when input is between D and U, $$\text{Output} = a^{\gamma 2} \times B \qquad \text{[Equation 12]}$$

where
a=(input−D)/(U−D),
$\gamma 2$=log(target/MAX)/log(RM/MAX), and
target=(OM×$\alpha$+RM)/(1+$\alpha$).

When the constant $\alpha$ is set to 1, target is set between the median value prior to the Retinex process and the median value after the Retinex process. The value of target is set to approach the median value of the original image when the constant $\alpha$ is greater than 1, and to separate from the median value of the original image when the constant $\alpha$ is less than 1. The constant $\alpha$ may be set to a predetermined value or may be arbitrarily set by the user.

In the above-described embodiment, the RGB color system is used, but a color system other than the RGB color system may be used. For example, the invention may be applied to the CMY color model or the like.

In the above-described embodiment, the CPU 11 provided in the printer 1 executes the image processing program. However, this program may be provided to a personal computer as an application program that is executed by a CPU or the like provided in the personal computer. Further, the program may be executed by a multifunction peripheral having a plurality of functions including printer, scanner, copier, facsimile, and the like.

Either the single-scale Retinex (SSR) or multi-scale Retinex (MSR) method may be used in the Retinex process.

In the above-described embodiment, the CPU 11 in the printer 1 performs the Retinex process and the like. However, these processes may be performed with a digital signal processor (DSP). The DSP can be used to execute product-sum operations and other operations more quickly.

In the pre-process according to the second embodiment, the clipped range for normalizing reflectance values of the original image is set based on the reduced image. However the user may set this clipped range to arbitrary values inputted via the control panel 16. This method eliminates the process for finding the clipped range (normalizing parameters), enabling the printer 1 to perform the Retinex process more quickly.

At this time, the clipped range may be set as numerical values or may be stored as a plurality of preset values from which a desired clipped range can be selected. Further, clipped ranges may be preset for different types of images, and the printer 1 may determine which type of image most closely resembles an image inputted for processing and may apply the clipped range for this image.

The original color image in the second embodiment is separated into luminance signals and chromatic signals (YCbCr), and the Retinex process is performed on the luminance signals. Subsequently, the color image is restored based on the chromatic signals. However, it is also possible to perform the same process, but separate the original color image into luminance signals and color-difference signals (YIQ).

In the above-described embodiments, a luminance value Y is calculated from pixel values (RGB) of a color image, then a Retinex process is performed on the luminance value Y. However, the Retinex process may be performed on each of RGB values.

What is claimed is:

1. An image processing device comprising:
a processor configured to execute instructions that causes the processor to provide functional portions including:
a reduced-image creating portion that creates a reduced image from an original image;
a reduced-retinex-image forming portion that calculates reflectance of each pixel in the reduced image based both on a pixel value of a subject pixel in the reduced image and on a peripheral average luminance of the subject pixel, thereby forming a reduced retinex image that is configured of reflectance of each pixel in the reduced image;
a normalizing-parameter setting portion that obtains frequencies of the reflectance in the reduced retinex image and that sets an upper limit and a lower limit for normalization; and
an original-image correcting portion comprising:
a retinex-image forming portion that calculates reflectance of each pixel in the original image based both on a pixel value of a subject pixel in the original image and on a peripheral average luminance of the subject pixel;
a first normalizing portion that normalizes the reflectance of the original image based on the upper limit and the lower limit, thereby obtaining a normalized reflectance for each pixel in the original image; and
a first correcting portion that corrects the original image based both on the normalized reflectance and on the pixel value for each pixel in the original image, thereby obtaining a corrected original image.

2. The image processing device according to claim 1, wherein the reduced-image creating portion comprises a sampling portion that samples pixels from the original image by a nearest neighbor method, thereby creating the reduced image; and
wherein the reduced-retinex-image forming portion calculates convolution between filter coefficients and pixel values of the pixels sampled by the sampling portion.

3. The image processing device according to claim 1, wherein the reduced-image creating portion comprises an image reducing portion that reduces the original image by an average pixel method; and
wherein the reduced-retinex-image forming portion comprises a calculating portion that calculates convolution between filter coefficients and pixel values of the pixels in the reduced image.

4. The image processing device according to claim 1, further comprising a storing portion that stores the reflectance of each pixel in the reduced image,
wherein the normalizing-parameter setting portion sets the upper limit and the lower limit based on the reflectance of each pixel in the reduced image stored in the storing portion.

5. The image processing device according to claim 1, wherein the reduced-retinex-image forming portion forms the reduced retinex image based on a luminance signal obtained from each pixel in the reduced image;
wherein the retinex-image forming portion calculates the reflectance of each pixel in the original image based both on a luminance signal obtained from the subject pixel in the original image and on the peripheral average luminance of the subject pixel; and
wherein the first correcting portion corrects the original image based both on the normalized reflectance and on the luminance signal for each pixel in the original image.

6. The image processing device according to claim 1, wherein the processor is further configured to provide an output portion that outputs the corrected original image obtained by the first correcting portion.

7. The image processing device according to claim 1, wherein the normalizing-parameter setting portion sets the upper limit and the lower limit based on a clipped range, the clipped range including pixels of a predetermined ratio of all pixels in the reduced image.

8. The image processing device according to claim 1, wherein the processor is further configured to provide:
a reduced-image correcting portion comprising:
a second normalizing portion that normalizes the reflectance of the reduced image based on the upper limit and the lower limit, thereby obtaining a normalized reflectance for each pixel in the reduced image; and
a second correcting portion that corrects the reduced image based both on the normalized reflectance and on the pixel value for each pixel in the reduced image, thereby obtaining a corrected reduced image;
a histogram creating portion that obtains frequencies of pixel values in the corrected reduced image obtained by the second correcting portion, thereby creating a histogram; and
a histogram-process parameter setting portion that sets a parameter used for a histogram process based on the histogram created by the histogram creating portion,
wherein the original-image correcting portion further comprises an original-image histogram process performing portion that performs the histogram process on the corrected original image based on the parameter set by the histogram-process parameter setting portion.

9. The image processing device according to claim 8, wherein the reduced-retinex-image forming portion forms the reduced retinex image based on a luminance signal obtained from each pixel in the reduced image;
wherein the second correcting portion corrects the reduced image based both on the normalized reflectance and on the luminance signal for each pixel in the reduced image to obtain the corrected reduced image, and converts the corrected reduced image into a first color image;
wherein the histogram creating portion obtains frequencies of pixel values in the first color image obtained by the second correcting portion;
wherein the retinex-image forming portion calculates reflectance of each pixel in the original image based both on a luminance signal of the subject pixel in the original image and on the peripheral average luminance of the subject pixel;
wherein the first correcting portion corrects the original image based both on the normalized reflectance and on the luminance signal of the subject pixel in the original image to obtain the corrected original image, and converts the corrected original image into a second color image; and
wherein the histogram process performing portion performs the histogram process on the second color image.

10. The image processing device according to claim 8, wherein the processor is further configured to provide a sampling portion that extracts a prescribed plurality of pixels in the reduced image created by the reduced-image creating portion, and
wherein the second normalizing portion normalizes the reflectance for each of the prescribed plurality of pixels based on the upper limit and the lower limit, thereby obtaining the normalized reflectance for each of the prescribed plurality of pixels, and wherein the second correcting portion corrects the reduced image based both on the normalized reflectance and on the pixel value for each of the prescribed plurality of pixels.

11. The image processing device according to claim 10, wherein the reduced-retinex-image forming portion forms the reduced retinex image based on a luminance signal obtained from each pixel in the reduced image;
wherein the second correcting portion obtains the corrected reduced image based both on the normalized reflectance and on the luminance signal for each of the prescribed plurality of pixels in the reduced image and converts the corrected reduced image into a first color image;
wherein the histogram creating portion obtains frequencies of pixel values in the first color image obtained by the second correcting portion;
wherein the retinex-image forming portion calculates reflectance of each pixel in the original image based both on a luminance signal of the subject pixel in the original image and on the peripheral average luminance of the subject pixel;
wherein the first correcting portion obtains the corrected original image based both on the normalized reflectance and on the luminance signal of the subject pixel in the original image and converts the corrected original image into a second color image; and
wherein the original-image histogram process performing portion performs the histogram process on the second color image.

12. A computer-readable storage device storing a set of program instructions executable on an image processing device, the set of program instructions comprising:
creating a reduced image from an original image;
calculating reflectance of each pixel in the reduced image based both on a pixel value of a subject pixel in the reduced image and on an peripheral average luminance of the subject pixel, thereby forming a reduced retinex image that is configured of reflectance of each pixel in the reduced image;
obtaining frequencies of the reflectance in the reduced retinex image and setting an upper limit and a lower limit for normalization;
calculating reflectance of each pixel in the original image based both on a pixel value of a subject pixel in the original image and on a peripheral average luminance of the subject pixel;
normalizing the reflectance of the original image based on the upper limit and the lower limit, thereby obtaining a normalized reflectance for each pixel in the original image; and
correcting the original image based both on the normalized reflectance and on the pixel value for each pixel in the original image, thereby obtaining a corrected original image.

13. The storage device according to claim 12, wherein the instructions for creating a reduced image comprise sampling pixels from the original image by a nearest neighbor method, thereby creating the reduced image; and
wherein the instructions for calculating reflectance of each pixel in the reduced image comprises calculating convolution between filter coefficients and pixel values of the pixels sampled by the sampling portion.

14. The storage device according to claim 12, wherein the instructions for creating a reduced image comprise reducing the original image by an average pixel method; and wherein the instructions for calculating reflectance of each pixel in the reduced image comprise calculating convolution between filter coefficients and pixel values of pixels in the reduced image.

15. The storage device according to claim 12, wherein the set of program instructions further comprises storing the reflectance of each pixel in the reduced image in a storing portion, and
wherein the instructions for normalizing the reflectance of the original image comprise setting the upper limit and the lower limit based on the reflectance of each pixel in the reduced image stored in the storing portion.

16. The storage device according to claim 12, wherein the instructions for calculating reflectance of each pixel in the reduced image comprise forming the reduced retinex image based on a luminance signal obtained from each pixel in the reduced image;
wherein the instructions for calculating reflectance of each pixel in the original image comprise calculating the reflectance of each pixel in the original image based both on a luminance signal obtained from the subject pixel in the original image and on the peripheral average luminance of the subject pixel; and
wherein the instructions for correcting the original image comprise correcting the original image based both on the normalized reflectance and on the luminance signal for each pixel in the original image.

17. The storage device according to claim 12, wherein the set of program instructions further comprises outputting the corrected original image obtained by the instructions for correcting the original image.

18. The storage device according to claim 12, wherein the instructions for setting an upper limit and a lower limit for normalization comprise setting the upper limit and the lower limit based on a clipped range, the clipped range including pixels of a predetermined ratio of all pixels in the reduced image.

19. The storage device according to claim 12, wherein the set of program instructions further comprises:
normalizing the reflectance of the reduced image based on the upper limit and the lower limit, thereby obtaining a normalized reflectance for each pixel in the reduced image;
correcting the reduced image based both on the normalized reflectance and on the pixel value for each pixel in the reduced image, thereby obtaining a corrected reduced image;
obtaining frequencies of pixel values in the corrected reduced image, thereby creating a histogram;
setting a parameter used for a histogram process based on the histogram created by the instructions for obtaining frequencies; and
performing the histogram process on the corrected original image based on the parameter set by the instructions for setting the parameter.

20. The storage device according to claim 19, wherein the instructions for calculating reflectance of each pixel in the reduced image comprise forming the reduced retinex image based on a luminance signal obtained from each pixels in the reduced image;
wherein the instructions for correcting the reduced image comprise correcting the reduced image based both on the normalized reflectance and on the luminance signal for each pixel in the reduced image to obtain the corrected reduced image, and converting the corrected reduced image into a first color image;

wherein the instructions for obtaining frequencies comprise obtaining frequencies of pixel values in the first color image obtained by the instructions for correcting the reduced image;

wherein the instructions for calculating reflectance of each pixel in the original image comprise calculating reflectance of each pixel in the original image based both on a luminance signal of the subject pixel in the original image and on the peripheral average luminance of the subject pixel;

wherein the instructions for correcting the original image comprise correcting the original image based both on the normalized reflectance and on the luminance signal of the subject pixel in the original image to obtain the corrected original image, and converting the corrected original image into a second color image; and wherein the instructions for performing the histogram process comprise performing the histogram process on the second color image.

21. The storage device according to claim 19, the set of program instructions further comprising sampling a prescribed plurality of pixels in the reduced image, and wherein the instructions for normalizing the reflectance comprise normalizing the reflectance for each of the prescribed plurality of pixels based on the upper limit and the lower limit, thereby obtaining the normalized reflectance for each of the prescribed plurality of pixels, and wherein the instructions for correcting the reduced image comprise correcting the reduced image based both on the normalized reflectance and on the pixel value for each of the prescribed plurality of pixels.

22. The storage device according to claim 21, wherein the instructions for calculating reflectance of each pixel in the reduced image comprise forming the reduced retinex image based on a luminance signal obtained from each pixel in the reduced image;

wherein the instructions for correcting the reduced image comprise obtaining the corrected reduced image based both on the normalized reflectance and on the luminance signal for each of the prescribed plurality of pixels in the reduced image and converting the corrected reduced image into a first color image;

wherein the instructions for obtaining frequencies comprise obtaining frequencies of pixel values in the first color image obtained by the instructions for correcting the reduced image;

wherein the instructions for calculating reflectance of each pixel in the original image comprise calculating reflectance of each pixel in the original image based both on a luminance signal of the subject pixel in the original image and on the peripheral average luminance of the subject pixel;

wherein the instructions for correcting the original image comprise correcting the original image based both on the normalized reflectance and on the luminance signal of the subject pixel in the original image to obtain the corrected original image and converting the corrected original image into a second color image; and wherein instructions for performing the histogram process comprise performing the histogram process on the second color.

23. An image processing method comprising:

providing an image processing device with an original image having pixel values, the image processing device having a processor for performing a retinex process, comprising the steps of:

creating a reduced image from the original image;

calculating reflectance of each pixel in the reduced image based both on a pixel value of a subject pixel in the reduced image and on an peripheral average luminance of the subject pixel, thereby forming a reduced retinex image that is configured of reflectance of each pixel in the reduced image;

obtaining frequencies of the reflectance in the reduced retinex image from a memory and setting an upper limit and a lower limit for normalization;

calculating reflectance of each pixel in the original image based both on a pixel value of a subject pixel in the original image and on a peripheral average luminance of the subject pixel;

normalizing the reflectance of the original image based on the upper limit and the lower limit, thereby obtaining a normalized reflectance for each pixel in the original image; and correcting the original image based both on the normalized reflectance and on the pixel value for each pixel in the original image, thereby obtaining a corrected original image.

* * * * *